United States Patent
Metelko et al.

(10) Patent No.: US 10,210,700 B2
(45) Date of Patent: Feb. 19, 2019

(54) GENERATION OF VARIATIONS IN COMPUTER GRAPHICS FROM INTERMEDIATE FILE FORMATS OF LIMITED VARIABILITY, INCLUDING GENERATION OF DIFFERENT GAME OUTCOMES

(71) Applicant: Inspired Gaming (UK) Limited, London (GB)

(72) Inventors: Peter Metelko, Burnley (GB); Stephen J. Goldman, Marsden (GB)

(73) Assignee: Inspired Gaming (UK) Limited, London (GB)

( * ) Notice: Subject to any disclaimer, the term of this patent is extended or adjusted under 35 U.S.C. 154(b) by 0 days.

(21) Appl. No.: 15/587,100

(22) Filed: May 4, 2017

(65) Prior Publication Data
US 2018/0322725 A1 Nov. 8, 2018

(51) Int. Cl.
*G07F 17/32* (2006.01)
*G07C 15/00* (2006.01)
*G06T 1/00* (2006.01)

(52) U.S. Cl.
CPC ........ *G07F 17/3211* (2013.01); *G07C 15/006* (2013.01); *G07F 17/3213* (2013.01); *G07F 17/3272* (2013.01); *G07F 17/3288* (2013.01); *G06T 1/0007* (2013.01)

(58) Field of Classification Search
CPC ............. G07F 17/3202; G07F 17/3211; G07F 17/3223; G07F 17/3225; G07F 17/3227
See application file for complete search history.

(56) References Cited

U.S. PATENT DOCUMENTS

| 5,860,924 | A | 1/1999 | Quistgaard |
| 6,213,876 | B1 * | 4/2001 | Moore, Jr. .......... A63F 3/00157 273/138.2 |
| 7,038,690 | B2 | 5/2006 | Wilt et al. |
| 7,274,368 | B1 * | 9/2007 | Keslin ................... G06F 9/5044 345/522 |
| 7,593,021 | B1 | 9/2009 | Tynefield, Jr. et al. |

(Continued)

FOREIGN PATENT DOCUMENTS

JP 3263201 B2 3/2002

OTHER PUBLICATIONS

Int'l Search Report and Written Opinion dated Oct. 2, 2017 in Int'l Application No. PCT/IB2017/052820.

*Primary Examiner* — Steven J Hylinski
(74) *Attorney, Agent, or Firm* — Panitch Schwarze Belisario & Nadel LLP

(57) ABSTRACT

A method and system is provided of enhancing the variability of high-quality computer graphics from limited sources utilizing minimal processing and bandwidth in real time. An underlying backdrop 3D model is generated. Next, Partially Rendered Pixels (PRP) of animated 3D characters are generated having lighting and texture information compatible with the underlying backdrop 3D model. The texture and other ancillary data are removed or omitted from the PRP animated 3D characters leaving only a detailed skeletal model. The extracted texture and other ancillary data are placed in a separate PRP lookup table. A fully rendered video segment is created from the PRP and a selected set of texture and other ancillary data.

15 Claims, 13 Drawing Sheets
(7 of 13 Drawing Sheet(s) Filed in Color)

(56) References Cited

U.S. PATENT DOCUMENTS

| | | | |
|---|---|---|---|
| 8,147,339 B1 | 4/2012 | Perry | |
| 8,151,199 B2 | 4/2012 | Gerson et al. | |
| 2002/0111212 A1* | 8/2002 | Muir | A63F 13/005 463/32 |
| 2003/0171144 A1* | 9/2003 | Letovsky | G07F 17/32 463/16 |
| 2005/0192086 A1* | 9/2005 | Walker | G07F 17/32 463/20 |
| 2005/0282638 A1* | 12/2005 | Rowe | G07F 17/32 463/42 |
| 2008/0012870 A1 | 1/2008 | Gies et al. | |
| 2008/0284798 A1* | 11/2008 | Weybrew | G06T 15/503 345/630 |
| 2009/0115133 A1* | 5/2009 | Kelly | G07F 17/32 273/274 |
| 2010/0227670 A1* | 9/2010 | Arezina | G07F 17/32 463/25 |
| 2010/0229108 A1* | 9/2010 | Gerson | G06F 3/011 715/757 |
| 2014/0038680 A1* | 2/2014 | Pececnik | G07F 17/3293 463/13 |
| 2014/0094277 A1* | 4/2014 | Guinn | G07F 17/3281 463/25 |
| 2017/0072309 A1* | 3/2017 | Perry | A63F 13/30 |

\* cited by examiner

GENERATION OF VARIATIONS IN COMPUTER GRAPHICS FROM INTERMEDIATE FILE FORMATS OF LIMITED VARIABILITY, INCLUDING GENERATION OF DIFFERENT GAME OUTCOMES

CROSS-REFERENCE TO RELATED APPLICATIONS

This application is related to U.S. application Ser. No. 15/587,088 concurrently filed on May 4, 2017 entitled "GENERATION OF VARIATIONS IN COMPUTER GRAPHICS FROM INTERMEDIATE FILE FORMATS OF LIMITED VARIABILITY, INCLUDING GENERATION OF DIFFERENT GAME APPEARANCES."

BACKGROUND OF THE INVENTION

1. Field of the Invention

The present invention relates generally to computer graphics, such as: video games, medical imaging, digital watermarking and the like. More particularly, this invention relates to methods for greatly enhancing the variability of computer graphics from limited sources utilizing minimal processing and bandwidth. Specifically, this innovation resolves the problem of the generation of a video file or stream in real time producing complex video output consisting of realistic models of three-dimensional (3D) objects with varying backdrop scenes.

2. Background

Computer generated graphics have substantially progressed since their introduction in the 1950's. One of the first interactive video games to feature recognizable, interactive graphics—"Tennis for Two"—was created for an oscilloscope by William Higinbotham to entertain visitors in 1958 at Brookhaven National Laboratory by simulating a tennis match. In 1961 at MIT (Massachusetts Institute of Technology), Steve Russell, created the second video game, "Spacewar" running on a Digital Equipment Corporation (DEC) PDP-1 model computer. Both of these pioneering video games employed extremely simple line and dot graphic primitives bearing only a faint resemblance to any real world counterparts.

In the 1970's the concepts of the hidden-surface algorithm, Gouraud and Blinn-Phong shading models, Z-axis plotting, bump mapping, and other innovations provided early breakthroughs in computer generated graphics that laid the foundation for much more detailed video graphics. However, the computer processing power available at the time hampered the lifelike appearance of computer video generated by these techniques.

Now, with the emergence of 32-bit and higher microprocessors as well as specialized Graphics Processing Units (GPUs) hardware, pre-rendered computer graphics used in films and video games are nearly scientifically photorealistic—i.e., almost impossible to discern the difference between real world and computer generated. However, real time graphics produced on very high-end systems, while closely simulating photorealism, do not achieve the photorealistic levels of pre-rendered graphics. The difference in output quality being attributable to the requirement for real-time graphics to produce an uninterrupted continuous varying video file or stream.

Thus, being able to generate photorealistic appearing 3D graphics in real time has become the holy grail of the video gaming industry and drives a continued push in hardware and software capability with new innovations that provide a strategic, albeit temporary, advantage for the innovating entity. Known techniques, and traditional approaches take the standard 3D geometry and texture model approach, rendering pixels using light and shading models in real time. Unfortunately, this approach has led to computationally expensive systems requiring dedicated hardware GPUs in conjunction with high-speed servers with sizable communication bandwidth requirements. Such hardware and bandwidth and the lack of it in mobile and home user environments have proven to be problematic.

For example, if photorealistic appearing 3D graphics are rendered at a central site (i.e., "render farms" with significant computational assets running continuously over hours) and downloaded to home and mobile systems in more or less real time the computational requirements problem can be solved by concentrating the expensive graphics hardware at the host's central site and distributing the generated photorealistic looking 3D graphics as video streams to individual consumers with mobile, home, and other platforms. Thus, in this model, the consumer's hardware is principally performing a display function that is not necessarily computationally intensive. However, this model has the disadvantage of high bandwidth requirements on a continuous basis that are typically expensive and may not be available to many users—especially mobile users. Conversely, if photorealistic looking 3D graphics are rendered on the consumer's device, the bandwidth requirements can be reduced; however, typically the consumer's device(s) is not able capable of performing computational processing rendering in real time with the graphic output quality significantly degraded at best.

Another example is for the photorealistic looking 3D graphics to be pre-rendered and downloaded to the consumer's device in advance of interactive play, thereby maintaining high levels of computational processing at a central site while at the same time reducing bandwidth requirements since the graphics could be downloaded in time multiples of their real time playback. However, the typical pre-rendered 3D graphics large file size severely restricts the variety of options available for real time game playback thereby significantly reducing consumer enjoyment of multiple plays since the video will be familiar after only a few viewings.

With medical imaging the tradeoffs between computationally expensive hardware and bandwidth are typically reduced with most viewing local to the hardware that generated the images. However, medical imaging typically is associated with very complex 3D models (i.e., human body) from multiple scan sources where the doctor chooses in real time to display various two dimensional (2D) slices of "compound scans" of the body that were previously acquired. Thus, the presentation of these 2D slices must occur real time or near real time with an accompanying substantial processing burden. When dynamic information (e.g., Doppler blood flow) is superimposed on these 2D slices (e.g., false color velocity of blood flow) the computational requirements become even more extensive. If these types of 2D compound scans are transmitted to a remote location, the available bandwidth also can potentially become problematic ultimately resulting in the sort of tradeoffs previously discussed with gaming.

Finally, pre-rendered graphics digital watermarking is well known in the art and is often utilized to ensure copyright protection as well as embedding other metadata.

However, digital watermarking with real time generated graphics is virtually unknown, partially due to the computational difficulties of embedding digital watermarks in video streams generated real time. The computational hardware required to include digital watermarks into a real time video stream being typically prohibitively expensive—both in terms of computational cycles and economics.

Attempts have been made to reduce processing requirements for rendering images in real time. For example, U.S. Pat. No. 5,860,924 (Quistgaard) teaches serially ganging multiplicities of processors each with specific image processing tasks thereby reducing the processing requirements on any single processor. However, "Quistgaard" typically requires expensive custom hardware or at the very least multiplicities of servers in serial and parallel configurations with the associated logistical and economic problems inherent in these types of complex processing configurations.

U.S. Patent Application Publication No. 2008/0012870 (Gies et al.) discloses analyzing each frame of a video stream and related color profile indicating parameters of the color space of the video stream and then converting each frame from a source color space to a working color space. The intent of this process is to convert in real time a video stream from one format to another—e.g., composite NTSC (National Television System Committee) format to HDTV (High-Definition TeleVision) format (paragraph [0024] of "Gies"). Thus, while "Gies" discloses efficiently converting one format of video to another, it does not address the core problems of source computational power and bandwidth tradeoffs nor how to maintain photorealistic looking graphics on consumer devices with variety and dynamic outcomes determined in near real time.

Color space conversion is also taught in U.S. Pat. No. 7,593,021 (Tynefield, Jr. et al.). In this process, color data is converted from one space to another with a driver determining if a color conversion function will be enabled and if so either with a single linear conversion or flagged to perform a non-linear conversion. Again, while this process discloses efficient methods of altering a video stream or file, it does not address the core problems of source computational power and bandwidth tradeoffs nor how to maintain photorealistic looking graphics on consumer devices with variety and dynamic outcomes determined in near real time.

U.S. Pat. No. 7,038,690 (Wilt et al.) discloses methods and systems for interfaces between video applications and consumer display screens that allow applications to intelligently use display resources of the consumer's device with a graphics arbiter providing display environment information to the video application, possibly transforming the video stream or file or allowing another application to transform the video stream or file. With "Wilt" the graphics arbiter also informs applications of the estimated time when the next frame will be displayed on the screen, thereby allowing applications to tailor output to the estimated display time, thus improving output quality while decreasing resource waste by avoiding the production of "extra" frames that will never be viewed. Thus, with "Wilt", processing efficiencies are gained via the graphics arbiter although source computational power and bandwidth tradeoffs are not significantly reduced. Additionally, "Wilt" makes no attempt to resolve the problem of maintaining photorealistic looking 3D graphics on consumer devices with variety and dynamic outcomes determined in near real time.

Thus, there is a need for a method or system to reduce the tradeoff between source computational power and bandwidth when transmitting a video stream or file of photorealistic appearing graphics from a central site to a consumer device. Ideally, this method or system would also increase the variety of dynamic outcomes displayable in near real time.

SUMMARY OF THE INVENTION

Objects and advantages of the present invention will be set forth in part in the following description, or may be obvious from the description, or may be learned through practice of the invention.

Described are mechanisms, systems, and methodologies related to generating very high quality graphics in real time with significant variation while reducing processing burdens. In some embodiments, the variation is processed on the consumer's device thereby also reducing bandwidth requirements.

In a particular embodiment, real world, high-resolution, digital images taken from appropriate locations (e.g., horse racing track, soccer or football stadium, boxing ring, medical body scan) are saved as backdrop images and then modified by superimposing multiplicities of 3D virtual or real world images over the saved backdrop. In this embodiment, the real-world backdrop images are formatted into a 3D world model with a moving scene produced (i.e., "backdrop scene") from the formatted 3D model, which is generic regardless of the 3D images superimposed over the backdrop scene. In another related embodiment, multiple backdrop scenes of the same location can also be recorded (e.g., varying weather conditions, different times of day, different types of scans of the same body) and formatted into associated 3D world models thereby increasing the variety.

With both of these embodiments, the various backdrop scenes can be optionally downloaded to the consumer or user's device in advance of a real time video feed, which would only contain superimposed multiplicities of 3D overlay images. Thus, these embodiments have the advantage of reducing both central site processing and bandwidth requirements by having the user or consumer's device perform all of the a priori backdrop scene processing. Alternatively, the 3D overlay images can be downloaded in advance with the 3D world models sans animation. This embodiment reduces real time bandwidth requirements by pre-downloading the backdrop and overlay models with only the animation (i.e., instructions for how the models will be displayed and interact) and other related formatting data transmitted in real time.

In another embodiment, the 3D images superimposed over the backdrop scene are rendered in significant detail such that their lighting and texture information is compatible to the underlying backdrop scene. When all of the 3D attributes have been determined, the associated texture data of the virtual images are exported into a new file format, which corresponds precisely to the backdrop scene previously saved. These virtual image files are effectively video frames of Partially Rendered Pixels (PRP), lacking only texture information. Depending on the embodiment, the PRP data is either combined with the backdrop scene at the central site or the consumer or user's device. In either case, this final "assembly" stage combines both the backdrop scene and the PRP data blending the two with a combination of texture maps. Thus, a great number of variations in the video display can be achieved with reduced imaging processing. Optionally, this increase in variability can include a portion processed by the consumer's device thereby also reducing bandwidth requirements.

In yet another embodiment, optional elements of PRP texture data can be omitted or replaced in real time to add variation to the displayed video. For example: complex shadow information may be added to PRP data to be compatible with nighttime backdrop scenes, but omitted during daytime scenes; or, portions of real world backdrop scenes may be overwritten with PRP data signage; or, digital watermark game features may be embedded in the Least Significant Bits (LSBs) of each PRP data video frame overwriting a portion of actual video data but not to the level where video quality is significantly degraded; or, blood flow portions of medical scan models may include PRP data thereby enabling false colors (e.g., Doppler blood flow) to be added in real time.

In still another embodiment, PRP generated video texture data is stored in a custom format consisting of one or many files. Rather than specifying colors for each pixel or region, the PRP video format of this embodiment includes variables that can be substituted for values in real time. When video playback is executed, the color variables are replaced in real time with a fixed value from an associated texture data table or array. Thus, this embodiment has the advantage of producing a potentially large variety of different appearing videos from a relatively small set of base videos with minimal processing by the device executing the display. These changes in appearance may be utilized to simply enhance visual variety or vary the apparent outcome of a game or appearance of the medical scan. For example, the colors of the "silks" of virtual jockey and horses can be varied from race to race thereby altering the appearance of the virtual race outcome, or the color coded velocity mapping of Doppler blood flow in a patient's medical scan can be changed as new data becomes available.

A number of mechanisms and methodologies that provide practical details for reliably producing very high quality graphics in real time with significant variation while reducing processing burdens are described below. Although the examples provided herein are primarily related to gaming applications, it is clear that the same methods are applicable to any type of real time or high-resolution video stream or file produced in real time or near real time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1A:
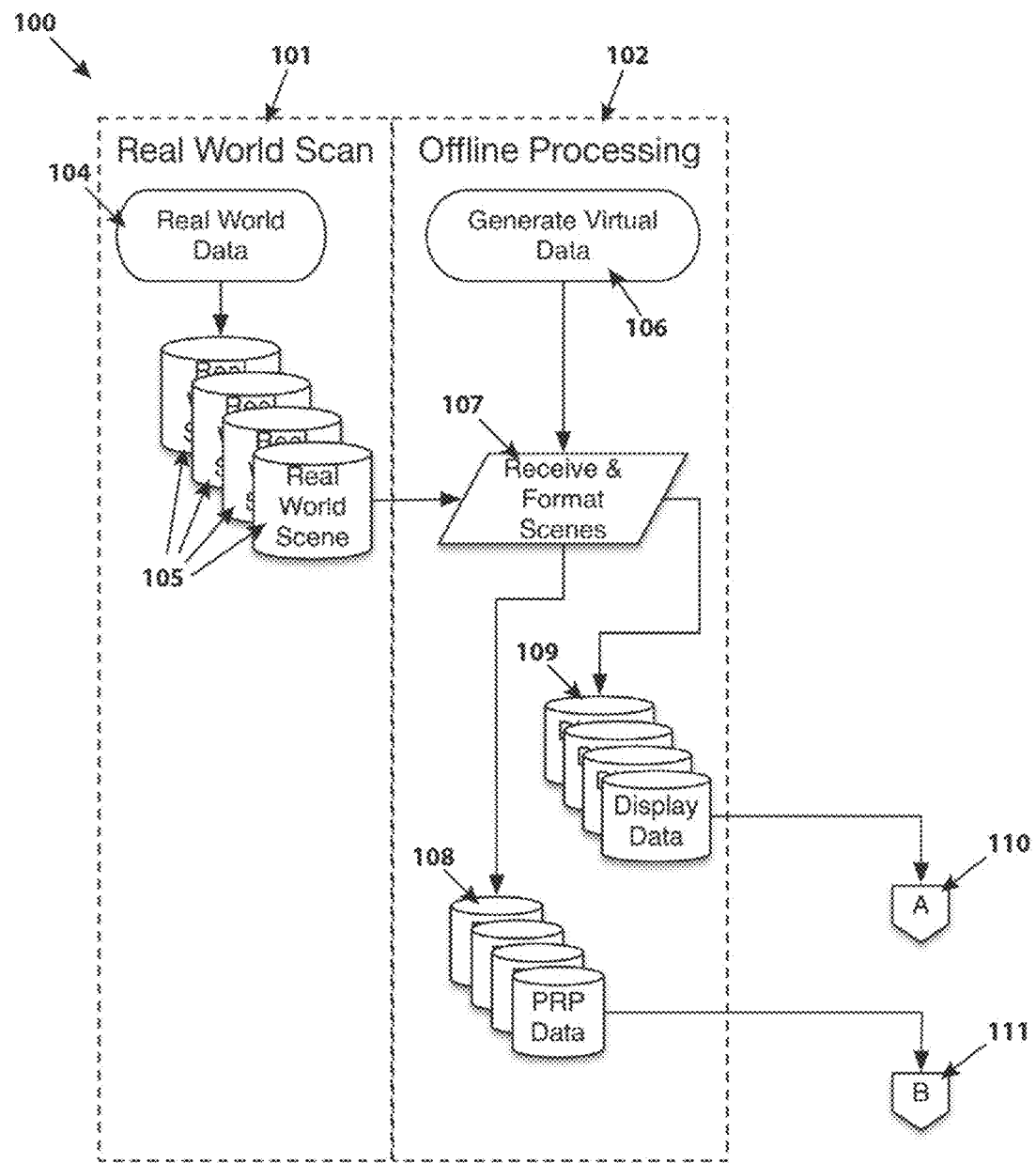
FIG. 1A is a swim lane flowchart of a first representative example of a real time pre-processing high quality graphics generator with distributed processing.

Ensuring the reduction of computational power and bandwidth when processing a video stream or file of photorealistic appearing graphics requires both segmentation and synchronized release of information. By distributing the processing of video information to each group in a system, as well as the timing of when the information is downloaded to the user's device, very high quality graphics can be produced in real time with significant variation while reducing processing burdens.

In the context of this invention a "group" can be defined as a collection of digital processing or scanning at a conceptual location. Thus, each "group" could be a separate geographical location hosting a defined set of digital processing functionality. Alternatively, a "group" can also be a logical collection of digital devices (e.g., servers, cameras, scanners) dispersed over multiple geographic locations with the shared functionality maintained by network connections. However, it is possible that the same physical device could be represented in different groups (e.g., the digital processor that collects and record real world data could also be used for offline processing).

"Partially Rendered Pixels" or "PRP" refers to pixels typically imaged on the surface of computationally complex 3D skeletal elements with texture information saved in a separate file that can be referenced and executed in real time. The term "texture data" refers to any additional data necessary to render a PRP generated character or model in photorealistic or near photorealistic detail (e.g., color, shadow, multi-shadow, luminance, optional surface patterns). Coordinated groupings of "texture data" where multiplicities of different data (e.g., related colors, surface patterns) combine to create an overall effect (e.g., tattoo that appears on a 3D virtual image with the correct grouping of "texture data") are referred to as a "set of texture data."

"Texture data" may also include metadata that is associated with a PRP generated character that controls some aspects of "game features" or "game appearance." Similar to a "set of texture data," a collection of metadata combined to create an overall effect is referred to as a "set of metadata."

"Game features," as used herein, refers to components that affect the response, feel, operation, or configuration of a digital game file when executed. More specifically, "game appearance" is similar to "game features", but as used herein specifically refers to components only altering a games' visual display. "Game features" may include altering visual (i.e., appearance) data, such as changing the color of "silks" on jockeys and horses in a virtual horse race to change the apparent outcome of a race. "Game features" also refer to metadata (e.g., sound, digital watermark, game flags, key words, description) that does not necessarily impact the visual appearance of the game. Texture data thus control or affect game features, some of which determine the visual appearance of the game and some of which determine non-visual aspects of the game.

The phrase "fully rendered video segment" refers to a video animation as displayed to the human player or user depicting a complete game or analysis showing all the relative information necessary to determine the game outcome or to conduct a complete analysis. In conjunction, the phrase "partially rendered video segment" refers to a core or fundamental video animation that is incomplete and does not include all of the "texture data" (e.g., colors) necessary for a fully rendered video segment. As used herein, both fully and partially rendered video segments include various animated "elements" (e.g., horses, boxers, athletes) that are comprised of computationally complex 3D skeletal characters with texture information saved in a separate file that can alter the 3D skeletal characters' appearance and can be optionally executed in real time. Finally, as used herein, the term "variable features" describes features or aspects of animated elements that can be changed with minimal computational burden by changing the texture data PRP reference file.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Figure 1B:
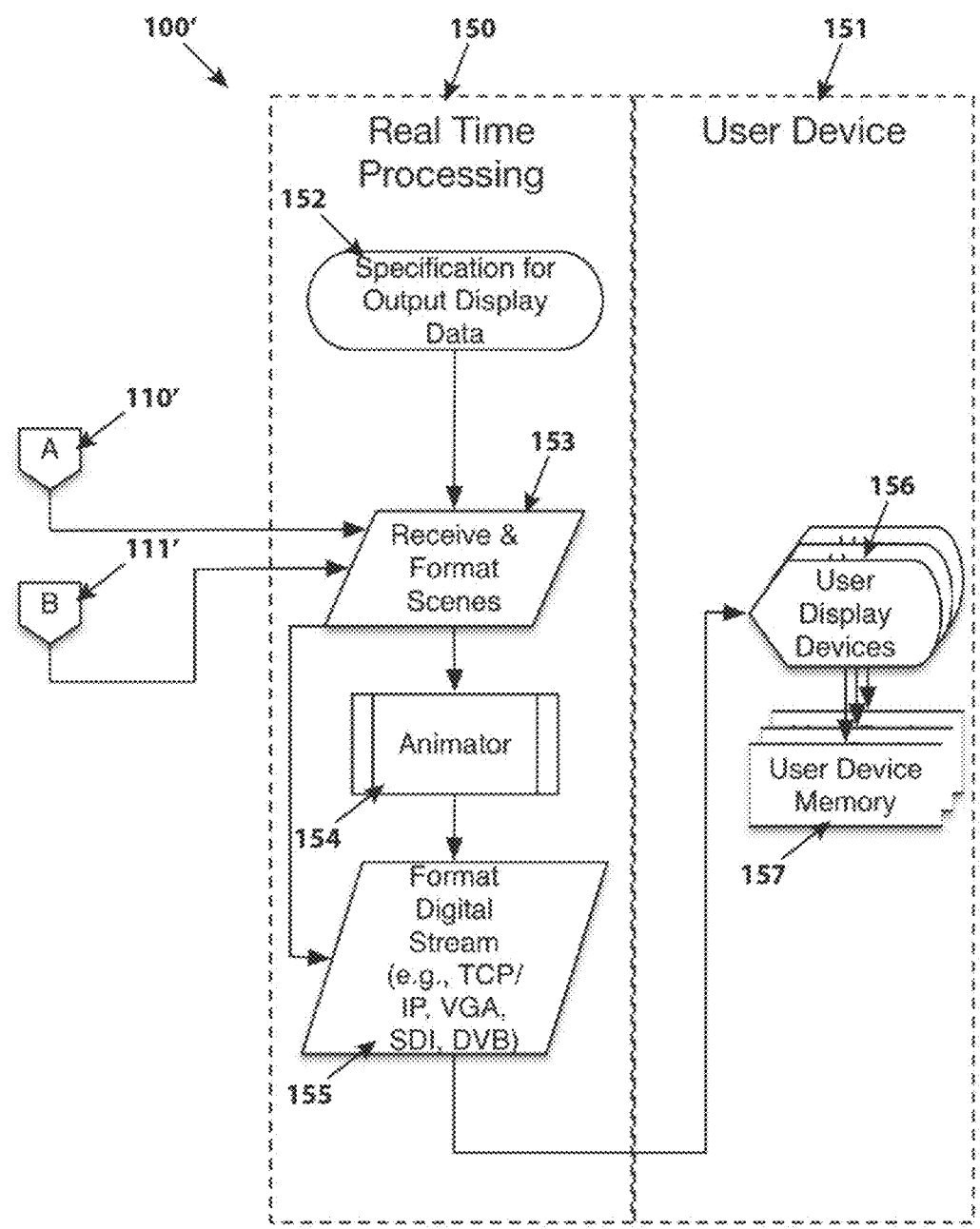
FIG. 1B is a continuation swim lane flowchart of FIG. 1A.

FIGS. 1A and 1B, taken together, illustrate one embodiment of generating high quality graphics in real time while reducing processing burdens utilizing a distributed processing system. As illustrated in the swim lane flowcharts 100 and 100' of FIGS. 1A and 1B, this one embodiment of the invention is conceptually divided into four groups (i.e., Real World Scan 101, Offline Processing 102, Real Time Processing 150, and User Device 151) by the four "swim lane" columns as shown in the two figures. If a particular flowchart function appears completely within a swim lane, its functionality is limited to the data category of the associated swim lane—e.g., Real World Scene(s) 105 is/are exclusively within Real World Scan group 101.

Figure 2A:
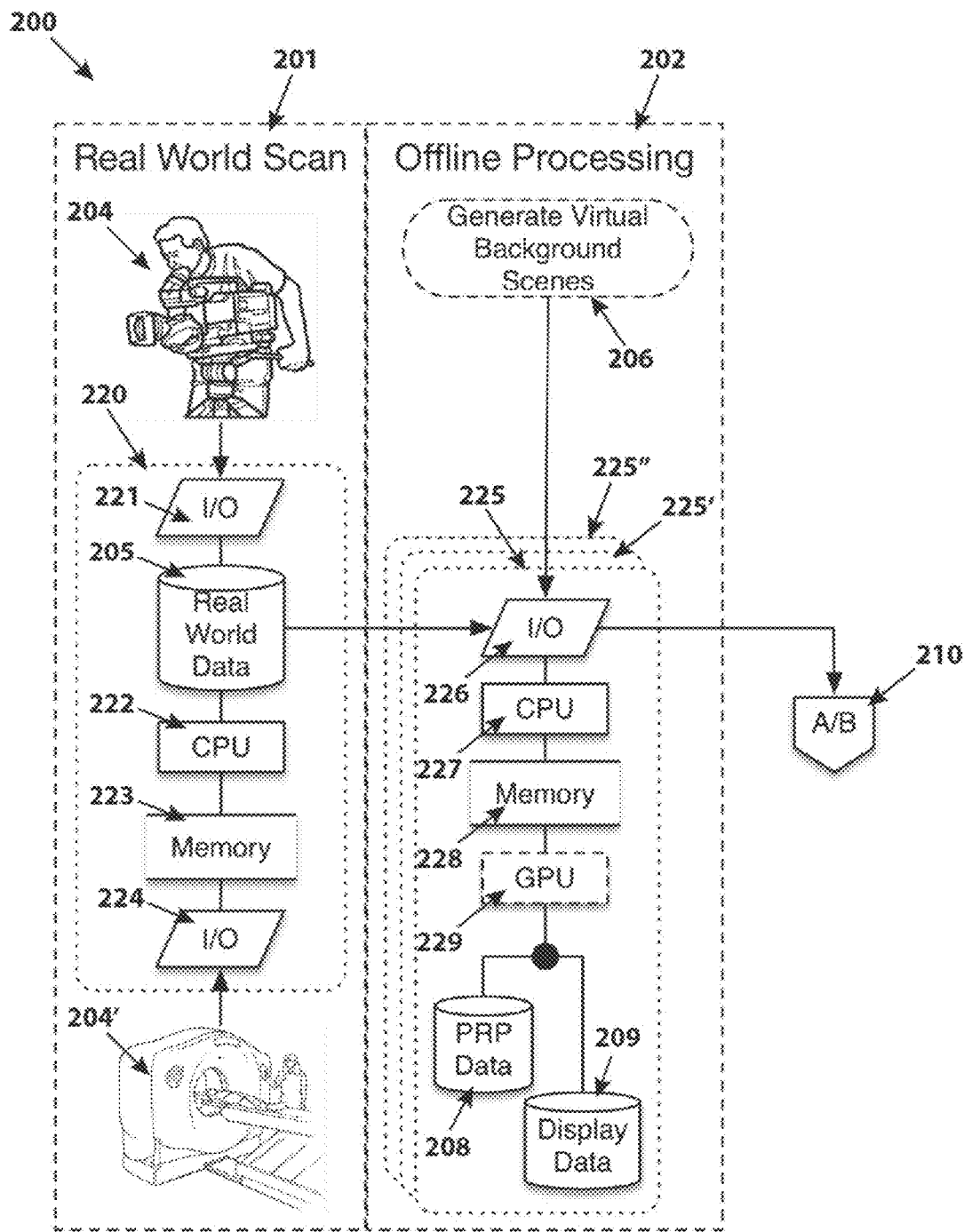
FIG. 2A is a system architecture diagram corresponding to FIG. 1A.
Figure 2B:
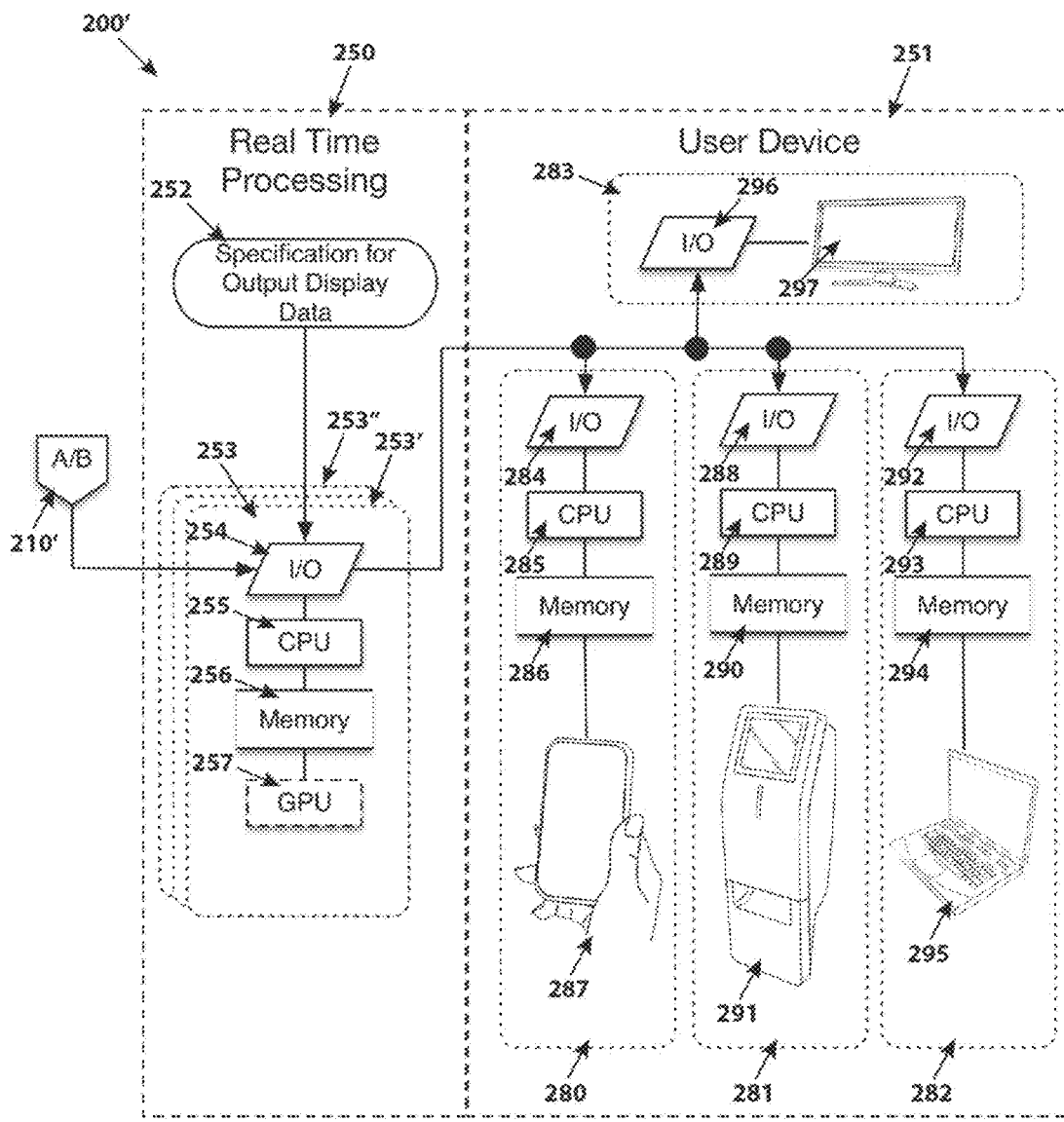
FIG. 2B is a system architecture diagram corresponding to FIG. 1B.

Additionally, FIGS. 1A and 2A as well as FIGS. 1B and 2B, each pair taken together represent portions of the same embodiment's system level flowchart and associated hardware architecture diagrams. FIGS. 1A and 2A pairing illustrating system level diagrams for the Real World Scan and Offline Processing groups with the FIGS. 1B and 2B pairing illustrating system level diagrams for the Real Time Processing and User Device 151 groups.

FIG. 1A swim lane flowchart 100 begins with recording Real World Scan 101 data 104 from various sources—e.g., horse track, boxing ring, soccer stadium, human body scans. This 3D recorded real world data is then saved as various scenes 105. The number of scenes recorded will vary depending on the application, with the intent to provide a seamless backdrop model suitable for superimposing multiplicities of 3D virtual images with the saved backdrop. Regardless of how the scenes were obtained, the resulting 3D backdrop model should be of sufficient complexity to allow dynamic selection of any portion of the 3D backdrop to permit animation superimposed on a smooth flowing backdrop. Alternatively, in some applications (e.g., video games, games of chance), the real world scans or scenes can be replaced with virtual (i.e., computer generated) backdrop scenes separately generated 106. In any case, the Offline Processing 102 input buffer 107 receives the backdrop scenes or images along with the 3D overlay virtual image models 106 typically rendered as Partially Rendered Pixels (PRP). The reformatted overlay PRP data 108 and backdrop display data 109 are then saved for further processing when required by the Real Time Processing 150 group as illustrated in the continuation of this embodiment 100' in FIG. 1B—see off-page connection "A" (110 and 110') for the display data 109 and off-page connection "B" (111 and 111') for the PRP data 108.

The display data 109 is received in the continuation of the embodiment 100' (FIG. 1B) via off-page connection "A" 110' with the PRP data 108 received via off-page connection "B" 111'. Upon receipt, the Real Time Processing 150 group's Input/Output (I/O) 153 processes the previously scanned or generated backdrop model and 3D virtual PRP images superimposed on the backdrop for either animated or on-demand freeze frame displays in compliance with the specifications 152. The resulting 3D PRP overlay images are generated in significant detail with (if appropriate) lighting and texture information selected to match the underlying backdrop scene. Additionally, the overlay 3D PRP images are generated to be compatible with the intended final application and associated backdrop. For example, if the application is gaming related, the overlay 3D virtual images will respond to either a game outcome as determined by a random process (e.g., a Random Number Generator—"RNG", physical ball drop machine, thereby making the game a game of chance), or embed variables such that the overlay 3D virtual images will respond to player input (e.g., first person shooting video game where a player chooses a uniform; poker game where a player buy in or betting patterns alters the color of chips) in real time. If a random process is determining the outcome of a game where various wagers were collected, for security reasons against insider fraud it is preferable that the random process be executed after the period for accepting wagers (i.e., the betting period) has expired.

Alternatively, if the application is medically related, the overlay images may respond to scanned data from different sources—e.g., vector blood flow Doppler data from sonograms and CAT (Computerized Axial Tomography) scans. Regardless of the application, the backdrop and the overlay 3D PRP virtual images can be optionally downloaded to the User Device's 156 nonvolatile memory 157 for playback at a later date or alternatively sent directly to the animator 154 algorithm. Regardless of the application, the backdrop and the overlay 3D PRP virtual images can be optionally downloaded directly to the animator 154 algorithm or alternatively to a User Device 156 at a remote location. The remotely located User Device 156 is also interchangeably referred to herein as a "local computer device," which in one preferred embodiment is a mobile device. At that remote location, the User Device's 156 nonvolatile memory 157 will store the backdrop and the overlay 3D PRP virtual images for playback and display at a remote location later.

In a preferred embodiment, when all of the overlay 3D virtual images have been generated, the texture information is removed leaving only detailed 3D skeletal element's information about the PRP virtual model 108. The removed texture data is then preferably exported into a new file format, which corresponds precisely to the associated backdrop scene. These files are effectively multiplicities of video frames of PRP data—i.e., pixels lacking only source texture information, and possibly animation details. By creating PRP formatted files 108 it becomes possible to rapidly change some parameters of the 3D virtual images with little processing burden in real time. For example, the colors of the "silks" of virtual jockey and horses can be varied from race to race thereby altering the virtual race outcome; or the color coded velocity mapping of Doppler blood flow model of a patient's medical scan can be changed as to only illustrate blood flows of a specified velocity range or blood containing a medical taggant (e.g., radioisotope) or some combination thereof; or digital watermark data can be embedded in each pixel's LSB, or sounds associated with a specific character can be embedded. Irrespective of the final usage, the PRP formatted files can be saved at the Offline Processing 102 group's nonvolatile memory 108 or alternatively exported to the User Device 151 nonvolatile memory 157 for later playback.

Finally, an animator algorithm 154 specifies where the overlay 3D virtual images will reside relative to the backdrop model and assembles, with optional animation, the 3D backdrop model with the overlay 3D virtual images. For example, static signage may be superimposed over a portion of the backdrop model (e.g., 312 of FIG. 3B) as well as dynamically animated virtual figures (e.g., virtual horses and jockeys 337 of FIG. 3D). The output of the animator 154 (FIG. 1B) is a customized and portable DLL (Dynamic Link Library) that can be implemented with the Real Time Processing 150 group formatting of the digital stream 155 or, alternatively, executed on the user display device 156. In other words, if a portion of the previously generated data was downloaded to a user display device's 156 nonvolatile memory 157, the animator 154 generated DLL will execute and display the composite images on the User Device 151 screen 156. Alternatively, the entire composite video stream can be downloaded from the Real Time processing group's 150 formatter 155 to the User Device 151 group's display screens 156 in real time or to the User Device 151 group's nonvolatile memory 157 for later playback without alteration.

Downloading of digital data formatted for television displays (e.g., VGA "Video Graphics Array", SDI—"Serial Digital Interface", DVB—"Digital Video Broadcasting", UDP/IP—"User Datagram Protocol/Internet Protocol") from the Real Time Processing 150 group to the User Device 151 group's displays 156 would typically occur in real time and consequently utilize high bandwidth channels (e.g., satellite feed, broadband cable). Downloading of digital data formatted as digital files (where the User Device 151 group's display 156 and memory 157 would conduct some additional processing) could theoretically have the advantage of requiring lesser bandwidth due to transmission of the file in multiplies of real time playback time with actual playback triggered separately or having portions of the 3D images downloaded ahead of the real time broadcast with the composite image being generated in real time on the display 156 device. Examples of transmission formats suitable for digital data arranged as digital files would be TCP/IP ("Transmission Control Protocol/Internet Protocol") or UDP/IP.

Thus, the distributed processing system 100 and 100' is inherently capable of multiplicities of methods of downloading composite video data from the Real Time Processing 150 group to the User Device 151 group depending on efficiency tradeoffs and timing requirements. Regardless of the method(s) employed to download the composite video data, ultimately the composite video data will appear on the screens of the User Device 151 group. The remotely located User Device 151 group, similar to the User Device 156, is also interchangeably referred to herein as a "local computer device," which in one preferred embodiment is a mobile device.

Embodiments' 100 and 100' associated system architecture diagrams 200 and 200' of FIGS. 2A and 2B, also include four groups (i.e., Real World Scan 201, Offline Processing 202, Real Time Processing 250, and User Device 251) visually differentiated by four swim lane columns in FIGS. 2A and 2B. Similar to the flowcharts, if a particular hardware function appears completely within a swim lane, its functionality is limited to the data category of the associated swim lane.

As before, the FIG. 2A swim lane system architecture diagram 200 begins with recording real world data (204 and 204') from various sources—e.g., real world horse track video 204 or medical scan data 204'. This 3D real world data is applied to a local computing device's 220 I/O buffer (221 or 224) and ultimately saved into nonvolatile memory 205 preferably linked with metadata—e.g., Global Positioning System ("GPS") data, human body anatomical plane coordinates. The collected real world data is structured by the Central Processing Unit (CPU) 222 and memory 223 into a 3D model where portions of the model can be randomly accessed with minimal processing delay. Alternatively, in some applications (e.g., video games, games of chance), the real world scans or scenes can be replaced with virtual (i.e., computer generated) backdrop scenes 206 generated by the Offline Processing 202 group.

In either case, the Offline Processing 202 group's server(s) 225, 225', 225", I/O buffer(s) 226 receive the backdrop scenes or images with the received data formatted in a manner compatible for processing with overlay images that are preferably in PRP format. Each Offline Processing 202 group's server (e.g., 225, 225', 225") is configured with a CPU 227, memory 228, and optionally a Graphics Processing Unit (GPU) 229. Though, it should be noted in most embodiments of the invention, efficiencies have been achieved through distributed processing and PRP data formatting that typically optional GPU modules are not required. Finally, also located on at least one Offline Processing group's 202 server (e.g., 225, 225', 225") is the nonvolatile memory for storing general display data 209 as well as PRP data 208.

Both the stored PRP data 208 and the display data 209 are transmitted on demand to the Real Time Processing 250 group's at least one server (e.g., 253, 253', 253") when required. This transmission of data is achieved via a common high-speed interface between the Offline Processing 202 group's server(s) (e.g., 225, 225', 225') and the Real Time Processing 250 group's server(s)—e.g., 253, 253', 253″. The exact type of communication interface is irrelevant to the invention so long as sufficient bandwidth is available to transmit all PRP data 208 and display data 209 within the time restrictions required. This interface is illustrated by off-page connection "A/B" 210 in FIG. 2A and 210' FIG. 2B.

In one embodiment the PRP data 208 and the display data 209 are received by the Real Time Processing 250 group's server(s) (e.g., 253, 253', 253″) I/O 254 with the partially completed data types optionally forwarded to the User Device 251 group's multiplicity of display devices—e.g., 280 (mobile device—e.g., smart phone or tablet), 281 (kiosk), 282 (laptop). As previously stated, by forwarding the PRP data 208 and the display data 209 files partially processed, this embodiment has the advantage of potential reduction in bandwidth requirements with the User Device 251 group's discrete I/O (284, 288, and 292) receiving the digital data files from the Real Time Processing 250 group's game server(s) or server(s) I/O 254 not necessarily in real time and storing the data in non-volatile memory (286, 290, and 294). With this embodiment, when it is time for the composite video to be revealed to the user, the DLL file previously created by the animator 154 (FIG. 1B) would execute on the FIG. 2B associated User Device 251 group's CPUs (e.g., 285, 289, and 293) with the output displayed on the associated displays (e.g., 287, 291, and 295). This embodiment has the advantage of decreased network bandwidth at the expense of some local processing being executed by the user's local computing device. The associated reduction in bandwidth requirements readily accommodates mobile wireless networks (other than Local Area Networks—"LANs") that typically have lower bandwidth availability. However, typically the processing is minimal, thereby making this embodiment compatible with most user local computing devices (e.g., 280, 281, 282) but is incompatible with televisions or monitors 283 that typically do not offer computing devices. The remotely located User Device 251, similar to the User Device 156, is also interchangeably referred to herein as a "local computer device," which in one preferred embodiment is a mobile device.

In an alternative embodiment, the PRP data 208 and the display data 209 received by the Real Time Processing 250 group's I/O 254 is processed on the Real Time Processing 250 group's servers (e.g., 253, 253', 253″) with the DLL executing locally on the CPU 255, memory 256, and optional GPU 257—though it should be noted that for simplicity and economy it is preferred that a GPU is typically not included. Thus, in this embodiment, the completed video stream is downloaded to the User Device 251 group's multiplicity of display devices—e.g., 280, 281, 282, and 283 (television or display screen 297). This embodiment has the advantage of requiring minimal processing on the User Device 251 group's display devices (e.g., 280, 281, 282, and 283), thereby possibly expanding the types of devices capable of displaying the video with the possible disadvantage of requiring increased transmission bandwidth.

The Real Time Processing 250 group transmitting partially or completely processed video file(s) is determined by the specifications 252 being implemented through a user interface (not shown in FIG. 2B) that directs the servers (e.g., 253, 253', 253″). In addition to the type of files and processing executed, the specifications 252 also stipulates the formatting of the transmission (e.g., VGA, SDI, DVB, UDP/IP, TCP/IP) from the Real Time Processing 250 group to the User Device 251 group's I/O ports (e.g., 284, 288, 292, and 296) with possibly different User Device 251 group's I/O portals requiring differently formatted data—e.g., TCP/IP being essentially incompatible with geosynchronous satellite communications portals due to the propagational delay (i.e., 270 milliseconds one-way and 540 milliseconds round trip) greatly slowing handshaking signals such that UDP/IP (i.e., no handshaking) or other formats are preferred.

Of course, as is apparent to one skilled in the art, in yet another embodiment the various groups in the previous embodiments can be reduced to one or two processors with the preprocessing and real time generation simply performed sequentially at different times. However, while this embodiment is theoretically possible, it is typically less desirable primarily due to the inefficiencies of processing serially with the associated time delays.

Figure 3A:
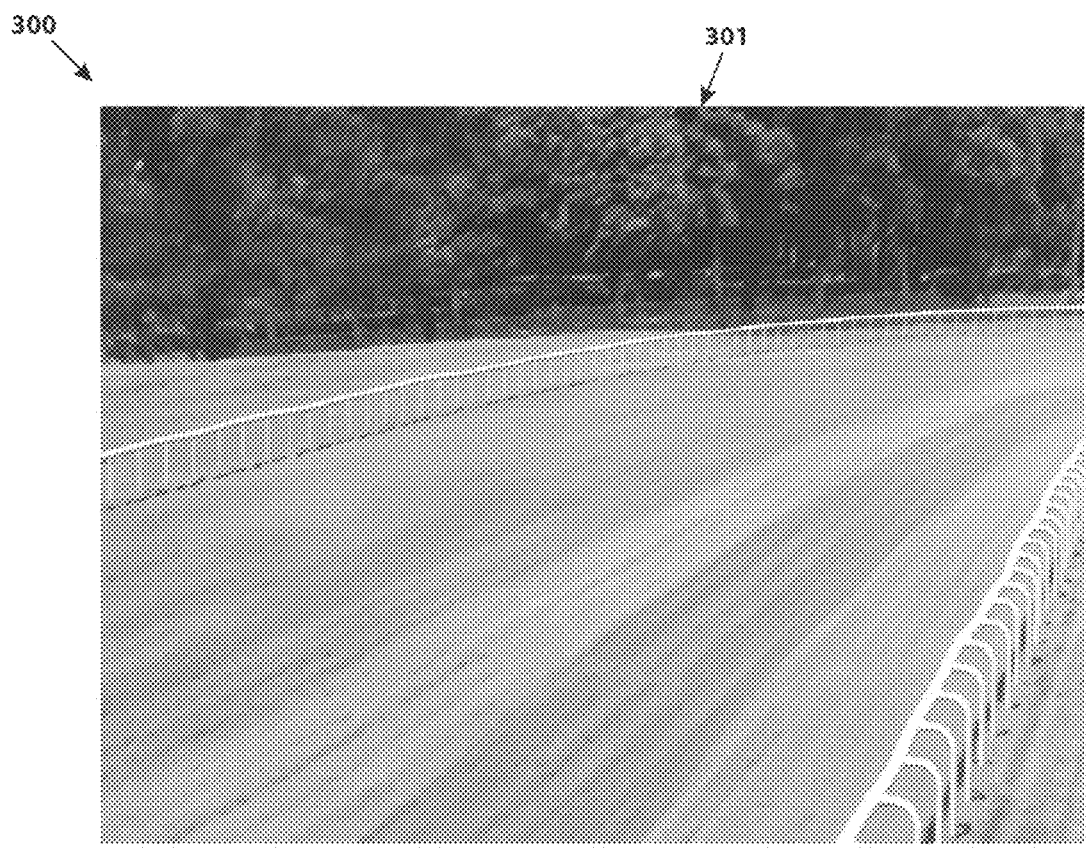
FIG. 3A is a representative example of a high-resolution, digital backdrop image taken from a real world race track.
Figure 3B:
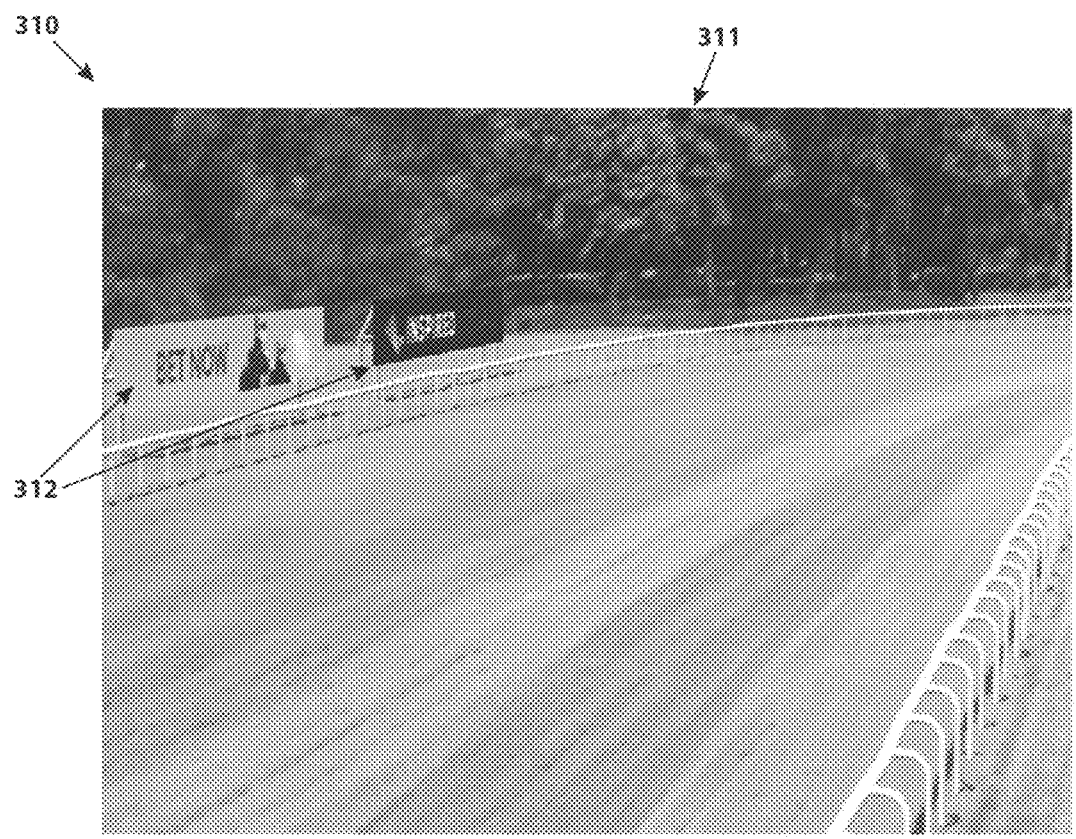
FIG. 3B is a first representative example of a high-resolution, digital backdrop image taken from a real world race track of FIG. 3A with multiple static 3D virtual images embedded in the background model.
Figure 3C:
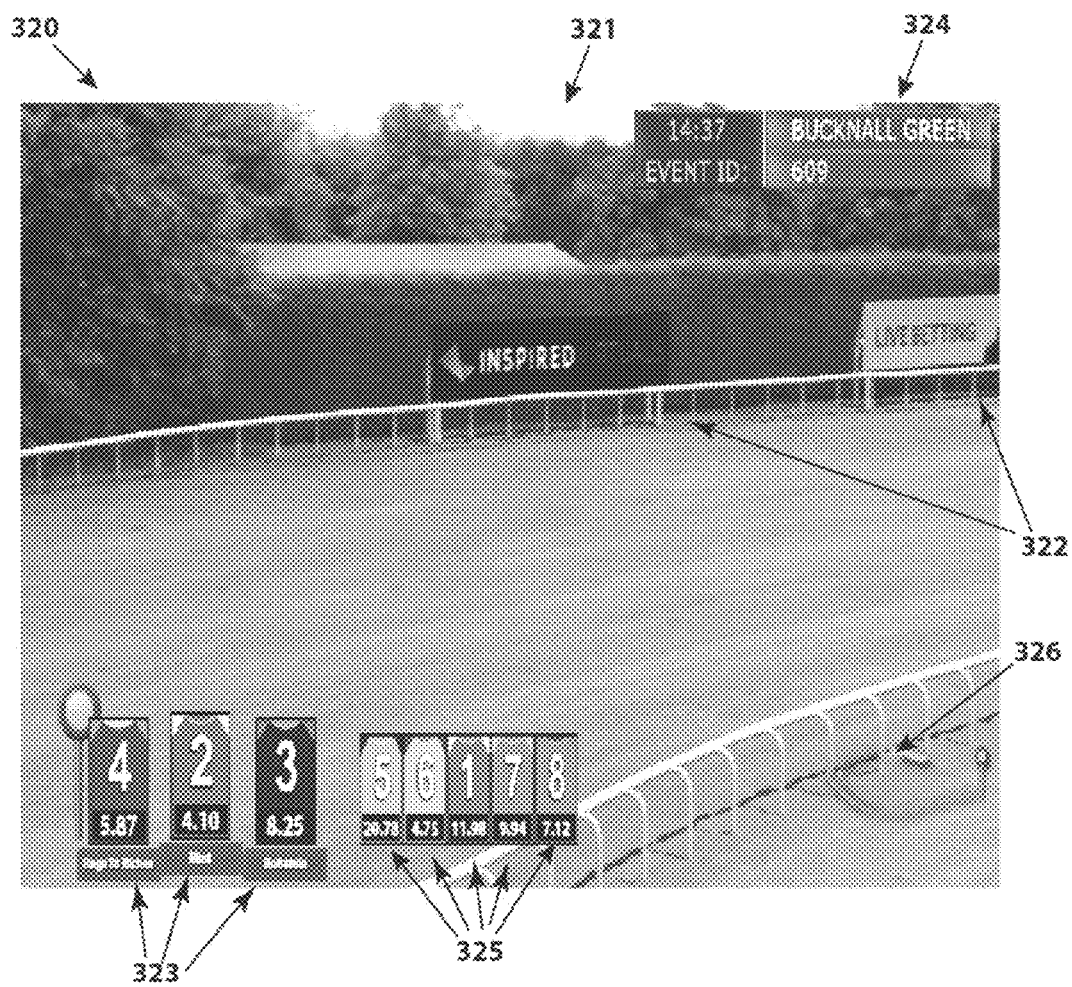
FIG. 3C is a second representative example of the high-resolution, digital backdrop image taken from a real world race track of FIG. 3A and FIG. 3B with multiplicities of dynamic virtual images superimposed over the backdrop as an added layer.
Figure 3D:
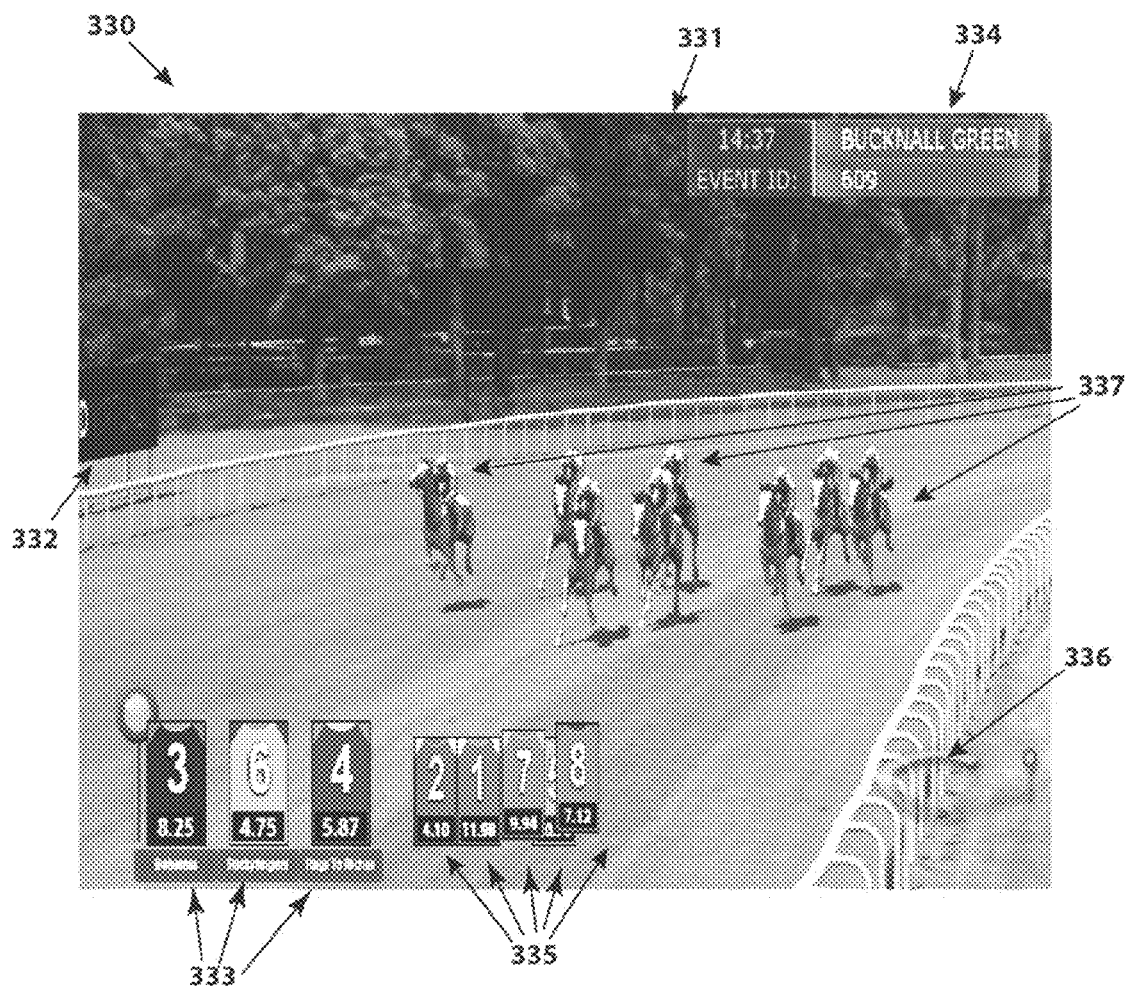
FIG. 3D is a third representative example of the high-resolution, digital backdrop image taken from a real world race track of FIG. 3A with the static images of FIG. 3B and dynamic overlays of FIG. 3C with the addition of multiplicities of dynamic 3D PRP virtual animated characters or images superimposed over the backdrop without any reference to an associated PRP lookup table.
Figure 3E:
FIG. 3E is a fourth representative example of the high-resolution, digital backdrop image taken from a real world race track of FIG. 3A with the same multiplicities of 3D virtual animated images superimposed as FIG. 3D, but with the color and texture variables of the "silks" of the virtual jockeys and horses augmented with a PRP color and texture table reference.
Figure 3F:
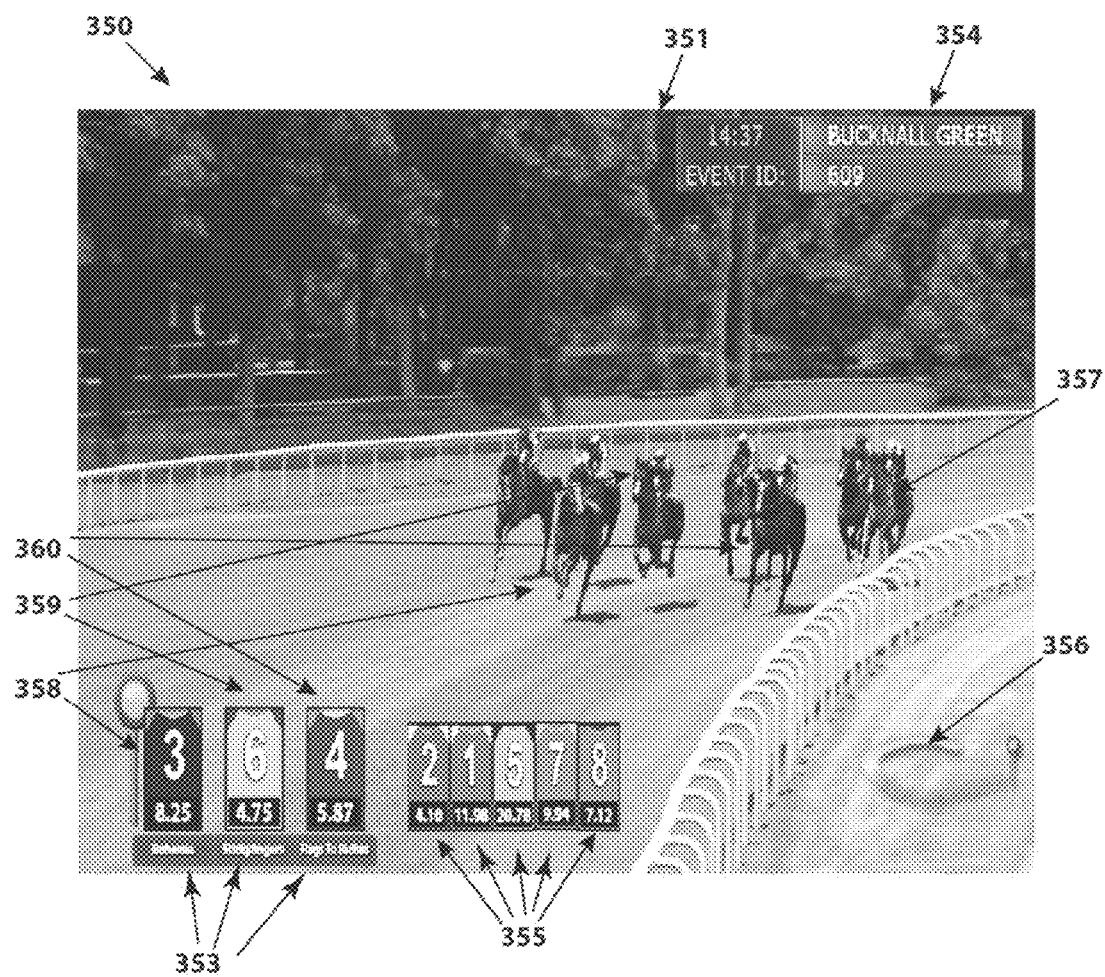
FIG. 3F is a fifth representative example of the high-resolution, digital backdrop composite image taken from a real world race track of FIG. 3A with the dynamic overlays of FIG. 3C and the dynamic 3D PRP virtual animated images or characters superimposed over the backdrop augmented with a PRP color and texture table reference.

FIGS. 3A through 3F taken together, illustrate one example of a real world backdrop model augmented with additional 3D virtual images, a portion of which are comprised of PRP data, that is compatible with the previously disclosed embodiments. These six figures progress from a recorded horse race track real world scene 301 (FIG. 3A) forming a 3D background model, to the same scene 311 enhanced with 3D static virtual images 312 embedded in the background model (FIG. 3B), to virtually the same scene 321 further enhanced with an overlay layer that includes multiple dynamic images (323 through 326) providing an indication of how the virtual race is progressing (FIG. 3C). PRP formatted animated 3D virtual images of horses and jockeys 337 are added in another layer (FIG. 3D); however, no color or texture lookup table is referenced with the presented PRP images. FIG. 3E illustrates the same animated PRP formatted 3D virtual images of horses and jockeys 347 of FIG. 3D with a PRP color and texture lookup table added. Finally, FIG. 3F illustrates a composite scene 351 of the previous real world background model including dynamic overlays (353 through 356) as well as PRP formatted animated 3D virtual images of horses and jockeys 357 with associated PRP color and texture lookup tables referenced—i.e., an example displaying how the scene would be seen by the consumer. These six figures together exemplify the composite high-resolution video graphics generated by the invention as well as demonstrating how the perceived appearance of the virtual race results can be changed without utilizing computationally intensive processing.

FIG. 3A illustrates one example of a backdrop 3D model 300 generated from real world scan data that is compatible with the previous embodiments of the invention. In the example shown in FIG. 3A, the backdrop scene 301 is of a deserted horse race track (i.e., no horses, people, and the like) with metadata (e.g., GPS coordinates) also embedded in it and the associated 3D model 300. In this example, the entire backdrop 3D model 300 is sans moving objects because the model is intended for a gaming application wherein virtual PRP horses and riders will be superimposed over the backdrop 3D model. Therefore, any moving objects recorded in the 3D backdrop model 300 could potentially interfere with superimposed virtual PRP horses and riders animation when the composite game video is generated. Of course, in other backdrop real world scan applications (e.g., medical scans, video games with street views), it may be desirable to include moving characters or objects in the 3D backdrop model.

FIG. 3B shows the same 3D model 310 generated from real world scan data of FIG. 3A, but with the addition of static virtual billboards 312 embedded in the 3D model 310—FIG. 3B. These static digital images 312 (that were superimposed and are not part of the original background scan) have been added to the 3D model 310 such that the billboards will be included in the background when this scene 311 of the 3D model 310 is displayed during animation. By embedding the static virtual billboards 312 in the backdrop 3D model 310 itself, the static billboards 312 assume their own coordinates within the 3D model and are consequently displayed whenever the same portion of the 3D model is displayed without any need for additional real time processing. It should be noted, that the term "static" in this context is only referring to this particular example 310 of background virtual billboards 312. In other examples, dynamic images (e.g., people, cars, beating heart, billboards with embedded animation) may be included in the background model by referencing a fourth dimension of time in the 3D model. The significant concept is added images are embedded in the 3D model 310 itself thereby performing all associated computational processing in advance, thus eliminating the requirements for the processing when displaying in real time.

With the example 320 of FIG. 3C, the 3D backdrop model 310 including virtual billboard 322 (FIG. 3C), is further enhanced with a first layer overlay 321 that includes multiple dynamic images (i.e., image content may change throughout the virtual race, but not necessarily the image positions relative to the viewing scene 321) that in this example are determined by the game progression and outcome (e.g., as controlled by a random process). As shown in the example 320 of a first layer overlay 321, the leaderboard 323 illustrates the "silks" as well as the numbers, odds, and names of the first, second, and third place horses in the virtual race. Also included in example 320 is a secondary board 325 displaying the "silks", numbers, and odds of the other horses in the virtual race. Additionally, there is a display overlay 324 listing the virtual racetrack name, time, and event identifier (ID). Finally, there is also a track position graphic 326 that provides a visual representation of the location on the virtual racetrack that the scene 321 is currently displaying. As is apparent to one skilled in the art, all of these dynamic images (i.e., 323 through 326) are easily modified during the virtual race with very little computational impact due to their relative simple structure and graphics. Thus, the overlay example 320 images (323 through 326) can be added to the composite video in advance or during real time with virtually no impact on real time processing requirements either way. In a preferred embodiment, these dynamic image data (323 through 326) are formatted as fonts or glyphs.

FIG. 3D 330 further enhances the example 320 of FIG. 3C by adding a second layer in which animated virtual PRP horses and jockeys 337 (eight illustrated in FIG. 3D) are superimposed over the backdrop 3D model creating a composite scene 331. However, in example 330 the animated virtual horses and jockeys 337 are shown as animated skeletal models in PRP format without any associated PRP color or texture lookup table reference. Thus, in composite scene 331 the animated virtual horses and jockeys 337 appear to have form and shadows, but no color or texture. By generating the high resolution video animation in an unreferenced PRP table format, the computational intensive portions of the rendered virtual horses and jockeys animation 337 may be generated and saved ahead of real time generation and display. This allows for the virtual race play and results to be changed at the time of real time generation and display by adding a color and texture lookup table to the PRP data that ultimately determines (among other potential things) the "silks" colors of the virtual horses and jockeys animation. However, the leaderboard 333, display overlay 334, secondary board 335, and track position graphic 336 all are illustrated as complete overlays. FIG. 3E provides an example 340 highlighting the change in appearance of the animated PRP horses and jockeys 347 by providing the same scene enhanced with only a PRP color and texture lookup table added—for emphasis, all static and dynamic overlays were omitted from the FIG. 3E illustration 341.

Thus, with any PRP data animation layer(s), the computationally intensive rendering (e.g., virtual horses and jockeys 337—FIG. 3D) may be executed in advance with a PRP lookup table referenced when the actual game video executes in real time. As a consequence, any conceivable type of display processor can easily accommodate the minimal additional processing required to access the PRP lookup table in real time. When PRP lookup table(s) runtime additions are then combined with the relatively simple dynamic overlays (323 through 326), the virtual race results can be effectively changed in real time with very little additional real time processing—i.e., the vast majority of computational rendering is generated in advance leaving only the trivial computations of placing dynamic overlays (323 through 326) and attaching PRP lookup table(s) to the PRP virtual horses and jockeys animation 337 remaining for real time processing. Thus, using these examples as guidance, a relatively small set of generic horse races can be rendered in high quality in advance with real time generation results varying depending on the game outcome as determined by a random process (e.g., RNG, physical ball drop machine). With this invention, relatively small numbers of preprocessed high quality rendered horse races enable exponential or even factorial numbers of variations in real time display, such that it becomes unlikely that a consumer would notice that the same preprocessed high quality rendering was displayed in real time more than once.

For example, FIG. 3F illustrates one possible example 350 of a game outcome scene 351 when executed in real time utilizing the preprocessed model 330 example of FIG. 3D. As shown in FIG. 3F, the addition of a PRP color and texture lookup table to the previously skeletal element's rendered animated virtual PRP horses and jockeys 357 allow for one possible outcome as displayed by the jockey and horses "silks" colors 357. In this example 350, each virtual PRP horse and jockey 357 would have their own individual references in the PRP lookup table resulting in a different appearance of the PRP horse and jockey 357 positions in the virtual race depending on the color and texture referenced in the PRP lookup table. Thus, simply altering the associated reference value(s) in the PRP lookup table can change the appearance of the "silks" of the lead or any other horse in the virtual race. When coordinated with the first layer overlay images (353 through 356) it can be readily seen how the progress and outcome of the real time video displayed race can be varied with minimal real time computational processing. As illustrated in the 350 scene 351, the lead PRP virtual horse and jockey "silks" colors are coordinated with the leaderboard display 358 along with the second and third place PRP virtual horse and jockey "silks" colors 359 and 360 respectively. As is apparent to one skilled in the art, these results can be modified for another virtual race with minimal computational processing by simply changing the PRP lookup table and the coordinated leaderboard display 353 and 355 images without affecting the computationally intensive 3D background model or the PRP animated renderings.

Therefore, by superimposing 3D overlay animated PRP virtual image models 357 with the backdrop 3D model 300 and 310 (FIG. 3A and FIG. 3B respectively), composite scenes 350 (FIG. 3F) can be created with animated (e.g., 357) and overlays (353 through 356) in compliance with the specifications 152 and 252 (FIGS. 1B and 2B respectively) in a composite real time video format. The appearance and outcome of the resulting composite real time video typically being variable and related to additional input (e.g., RNG, ball drop machine, user decisions) in accordance with the specifications 152 and 252 (FIGS. 1B and 2B respectively).

The PRP skeletal models augmented with additional file texture data lookup table(s) also has utility in ways other than determining a game's outcome. In an alternative embodiment, PRP models with texture data lookup table(s) can be employed to increase the apparent variety of a fixed number of processor intensive photorealistic looking 3D graphics previously rendered. With this embodiment, varying PRP texture data lookup table(s) can be optionally combined with static signs, simple overlays, and the like, to provide perceptions of real time generated videos that can be readily changed with very little additional real time processing required. Therefore, the appearance of a relatively small number of preprocessed high quality rendered videos can be expanded exponentially or even on a factorial scale in real time. For example, assume for a given video there are three backdrop 3D models available, with twenty PRP animated 3D character files, and forty PRP lookup tables; then according to the "rule of product" the number of possible different combinations is (3*20*40=2,400) or two thousand and four hundred different appearing videos when displayed in real time from a set of three backgrounds, twenty computationally expensive videos, and forty PRP lookup tables.

Figure 4A:
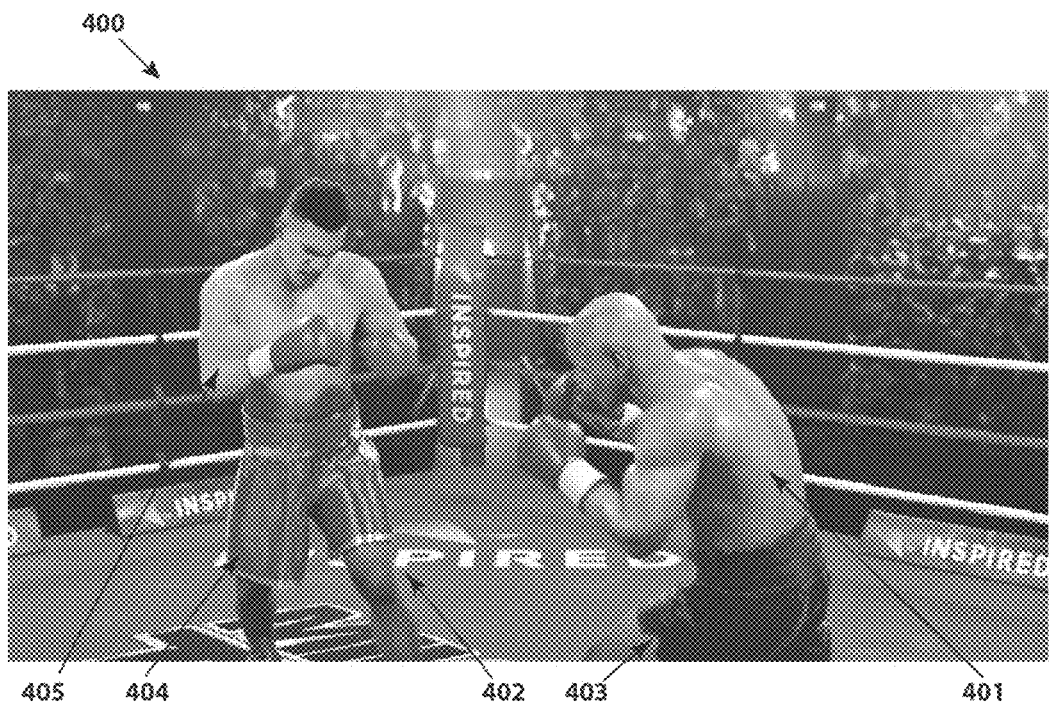
FIG. 4A is a representative example of dynamic 3D PRP virtual animated characters with one texture data lookup table.
Figure 4B:
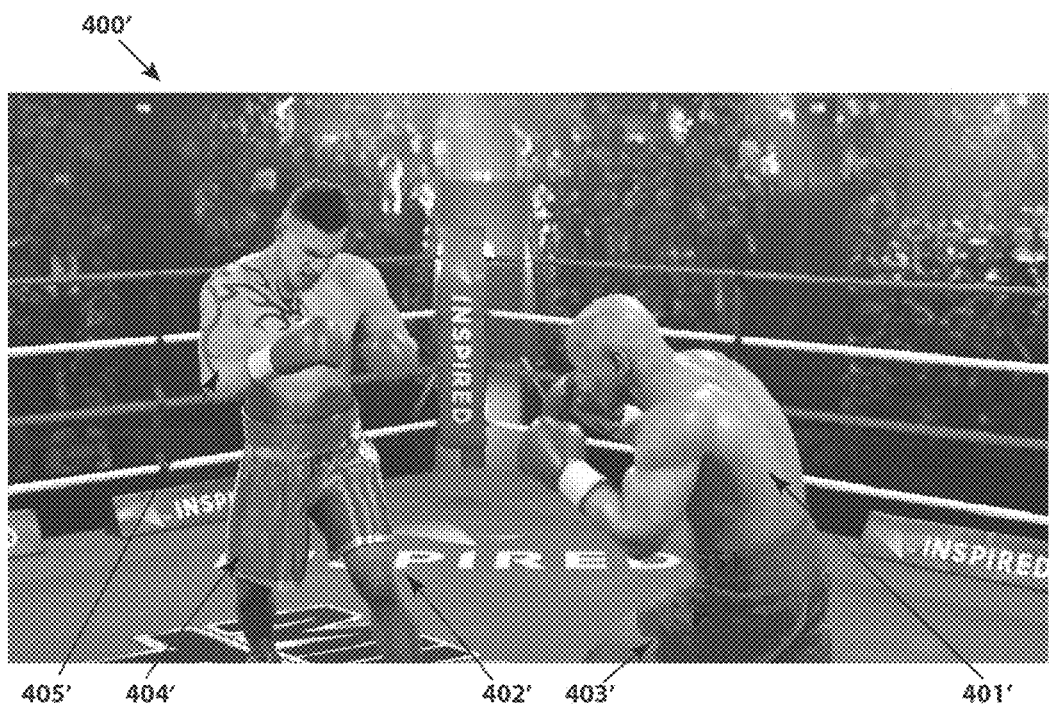
FIG. 4B is a second representative example of the same set of dynamic 3D PRP virtual animated characters of FIG. 4A albeit with an alternative texture data lookup table.

One example of varying the appearance of a 3D video by changing only its PRP texture lookup table is provided in FIGS. 4A and 4B. As shown in FIG. 4A, a scene 400 from a photorealistic 3D graphics boxing match game is depicted with two computer generated characters—i.e., a virtual Mike Tyson 401 and a virtual opponent 402. In this scene 400, both computer generated characters (401 and 402) were generated as PRP skeletal models with their associated texture data saved in a separate PRP texture lookup table providing color information. In scene 400, the PRP texture lookup table results (among other things) in black trunks 403 for the Mike Tyson character 401 and blue trunks 404 for the opponent 402. Additionally, the opponent 402 is illustrated with clean (i.e., unmarked) arms and torso 405. As previously stated, the PRP skeletal models are computationally expensive to render with the colors added by the PRP texture table lookup typically requiring trivial processing. Thus, by using the same PRP skeletal models (401 and 402) and only changing the PRP texture lookup table, a scene 400' differing in appearance can be rendered with virtually no change in the real time processing requirements.

As shown in the modified scene 400' of FIG. 4B, the same PRP skeletal models (401' and 402') appear with different color trunks due to referencing a different PRP texture lookup table—i.e., the Mike Tyson character 401' now appears to be wearing blue trunks 403' with the opponent 402' wearing red trunks 404'. Furthermore, the opponent's 402' arm and torso now appear to include a tattoo 405'. This appearance of a tattoo 405' on the opponent 402' in scene 400' was accomplished by essentially highlighting partially rendered pixels present in both skeletal models 402 and 402' with a different color in scene 400' than in scene 400. In other words, the PRP color lookup table associated with scene 400 (FIG. 4A) colored the potential tattoo pixels on the opponent's 402 arm and torso 405 in a pallet similar to the rest of the model's skin tone. However, in scene 400' (FIG. 4B) different colors were referenced for the tattoo pixels on the opponent's 402' arm and torso 405', thereby providing a much greater contrast to the model's skin tone. Thus, the appearance of the scene 400 (FIG. 4A) can be varied substantially 400' with a simple substitution of a PRP color lookup table at a trivial run time computational cost.

The appearance of a new feature or object by changing the PRP color lookup table as illustrated in FIGS. 4A and 4B, can be readily expanded to include the disappearance or appearance of PRP skeletal models in their entirety. For example, by simply zeroing out the values of the PRP skeletal model lookup table for all colors used the associated PRP skeletal model essentially becomes transparent or invisible. Thus, making the computationally intensive PRP skeletal model invisible to the viewer (i.e., the PRP skeletal model is an overlay layer over the background scene), which in turn allows various PRP skeletal model to be added or deleted from a video with the trivial computationally impact of simply adding color values to the lookup table.

Figure 5:
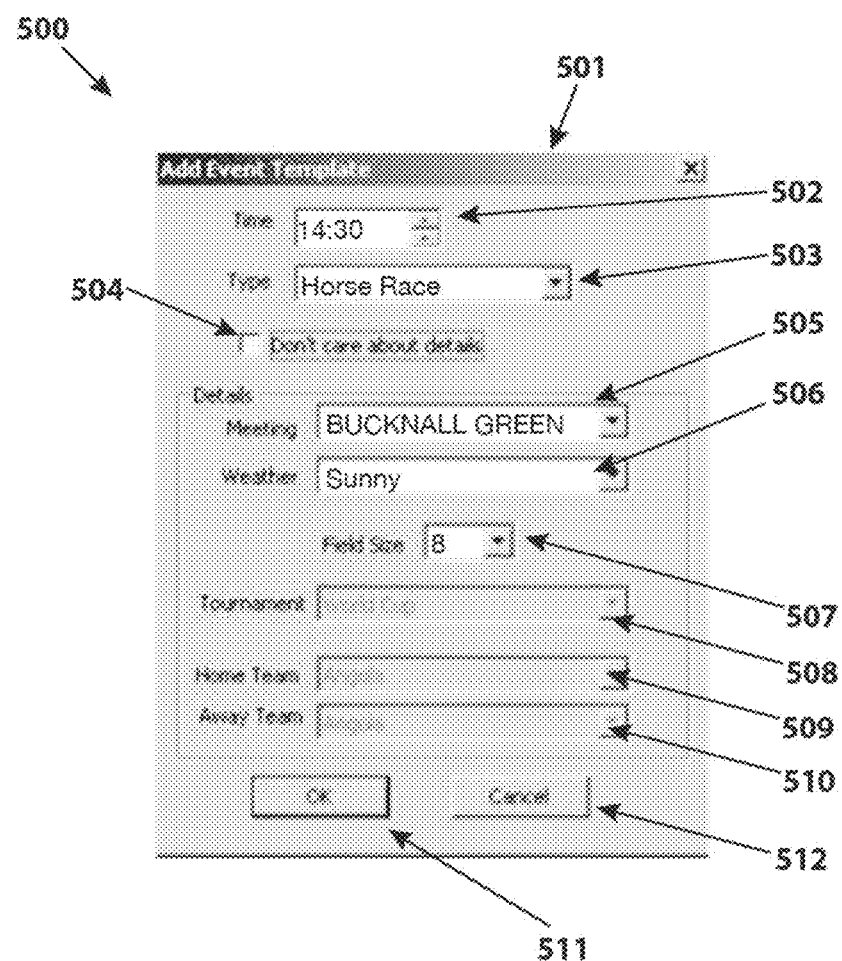
FIG. 5 is an illustrative example of the user interface enabling control of the video's appearances of FIG. 3B through FIG. 3F; and, FIG. 6 is a code snippet example illustrating the PRP file format and types used in PRP lookup tables.

FIG. 5 provides an illustrative example 500 of one of the Real Time Processing group (150 and 250—FIGS. 1B and 2B, respectively) operator interface 501 enabling control of the game video's appearance in the example of FIG. 3F. As shown in the figure, the operator interface 501 includes multiplicities of user selectable parameters that enable a specification to determine the configuration of the generated DLL and consequently the look, feel, and configuration of the game video. For example, entry parameter 502 allows the operator to specify the time (i.e., "14:30" as illustrated) that the game video will run with entry parameter 503 specifying the type of event (i.e., "Horse Race" as illustrated). As an option, in example 500, clickable tick mark 504 allows the automated system to select the rest of the parameters on a pseudorandom basis.

If enabled, the detail portion of operator interface 501 allows for the selection of specifics about the video to be user generated. Entry parameter 505 selects the 3D backdrop model to be utilized with parameter 506 impacting the lighting of the overlay 3D model virtual images as well as possibly overriding the backdrop selection. Entry parameter 507 specifies the "Field Size", which in the context of example 500 specifies that eight virtual horses and jockeys will be generated for the overlay 3D model as illustrated in the example 350 of FIG. 3F.

Returning to FIG. 5, the grayed out entry parameter portions (508 through 510) can have the effect of changing the colors on PRP animated characters via changing the referenced PRP internal color table for the tournament 508 or teams 509 and 510. Finally, the "OK" button 511 initiates the video creation process thereby allow the specified parameters to drive the generation of the game video. Conversely, the "Cancel" button 512 allows the user to exit this mode without initiating any video generation.

Of course, example 500 illustrates just one possible configuration of an operator interface 501 suitable for specifying the generated DLL and consequently the look, feel, and configuration of the game video. As is apparent to one skilled in the art, there are numerous other possible operator interfaces (e.g., specifying source of game outcome, specifying which portion of a body scan to be viewed, specifying digital watermark data to be imbedded in PRP LSBs, establishing the odds for various PRP animated characters) that are too numerous to be displayed in detail with this invention. The significant point is that the invention preferably includes various user interfaces to automate (and therefore standardize) the generation of the video and associated DLL in compliance with the specifications 152 and 252 (FIG. 1B and FIG. 2B respectively.

Partially Rendered Pixels (PRP), as their name implies, are embodied in a type of digital image file format that includes the portion of the image information (e.g., location, form, structure, lighting) that is computationally expensive to calculate, reserving some details (e.g., color tables, LSB values, luminescence, grey scale) to be saved in an external PRP table. Accordingly, PRP animated 3D characters are initially designed in significant amounts of detail with lighting and texture information carefully matched to the underlying backdrop 3D model. When all of the PRP animated 3D characters' attributes have been determined, the texture information (e.g., lighting, shadow, animation) is removed from the PRP animated 3D characters' digital image file, leaving only 3D skeletal element's data about the model—see 337 FIG. 3D. The PRP animated 3D characters' digital image file format corresponds precisely to its associated background backdrop 3D model previously produced. The removed texture being saved in separate PRP lookup table files. Thus, the computationally intensive portion of a video file can be computed in advance—lacking only source texture information.

Figure 6:
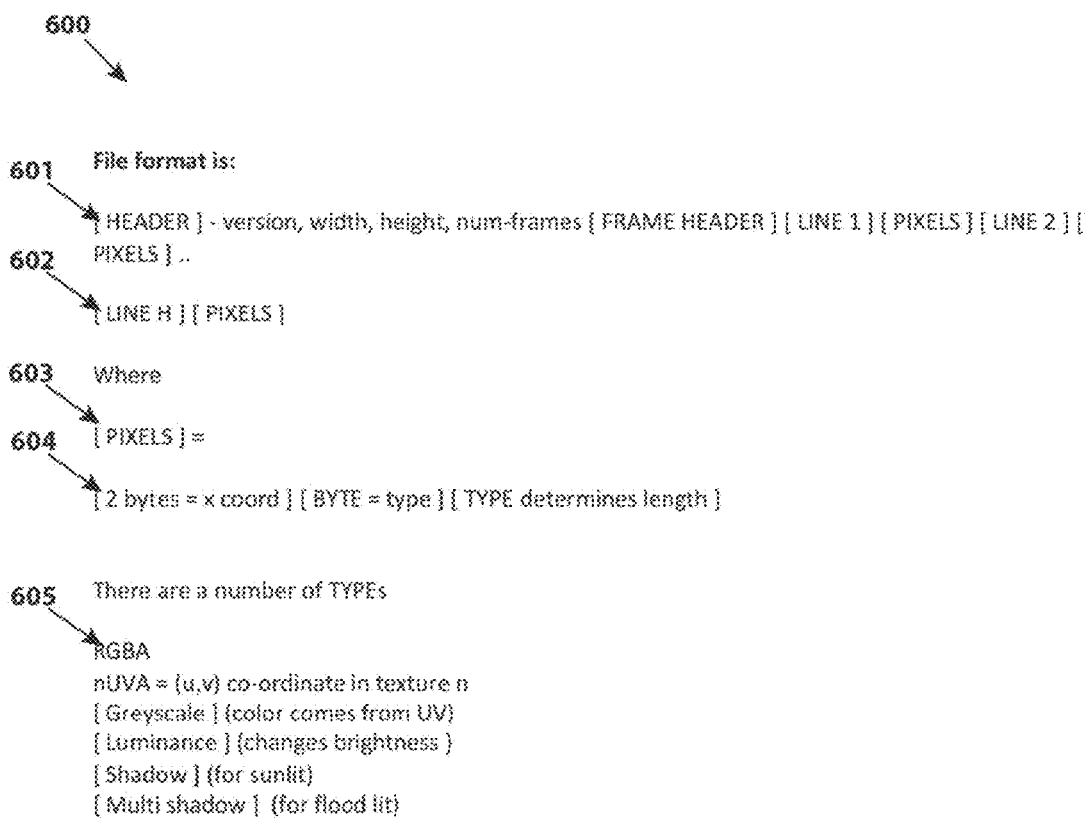

Real time processing is then relegated to assembly with an animator process 154 (FIG. 1B) reading in both the background backdrop 3D model, any optional overlays, the PRP animated 3D characters' skeletal models and associated PRP texture data lookup tables with the animator blending the PRP 3D characters' skeletal models PRP data with a number of PRP lookup tables—typically one PRP lookup table per character in the scene. The choice of PRP texture data lookup table texture maps can be decided at runtime and loaded dynamically per scene. Optionally, elements of PRP data can be omitted (e.g., complex shadow information may be present for night-time scenes, but omitted during day time background scenes) from the PRP lookup table at runtime. Finally, in addition to the video scenes, associated audio can be generated in a similar manner and saved in PRP lookup tables One typical example of a PRP file format and associated lookup table is provided in snippet 600 of FIG. 6. As shown in FIG. 6, the PRP file format snippet consists of a header 601 in which version, matrix dimensions, and number of frames are included and every pixel in the image is defined with respect to a line reference 602. Each pixel 603 in a line is defined as a two byte "X" coordinate 604 (the "Y" coordinate being defined by the line number) with another byte reserved for the PRP "type". The PRP type 605 referencing the external PRP lookup table, which can be any one of a multiplicity of different types—e.g., LSB; Red, Green, Blue, Alpha (RGBA); nUVA; grayscale; luminance; shadow; multi-shadow; audio; etc. The actual PRP lookup table structure has varying dimensions depending on the number of types specified.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method of playing a game of chance having a game outcome, the game of chance being played by a plurality of players at one or more remote locations, the game of chance being represented by a fully rendered video segment created from a variation of a partially rendered video segment, the partially rendered video segment not including texture data, the partially rendered video segment including a plurality of elements associated with the game of chance, each of the plurality of elements having one or more variable features defined by the texture data which allow for different game outcomes, the game of chance having a betting period where the game players wager on the game outcome of a currently executing game of chance, the method comprising:
   (a) generating the partially rendered video segment offline prior to game play;
   (b) storing in a memory of a local computer device prior to game play:
      (i) the partially rendered video segment, and
      (ii) a plurality of different sets of texture data, wherein the one or more variable features defined by the texture data determine the game outcome;
   (c) the server using an output result of a random process to select one of the different sets of texture data for the currently executing game of chance;
   (d) during game play, generating in the server a fully rendered video segment for the currently executing game of chance from the partially rendered video segment and the selected set of texture data, the fully rendered video segment showing the game outcome, and wherein each of the plurality of elements is rendered with one or more visibly different variable features, and selected variable features of one of the elements do not appear in any of the other elements, so that the texture data is visibly different for each of the plurality of elements; and
   (e) during game play, electronically transmitting from the server the fully rendered video segment to displays at the one or more remote locations for viewing by the plurality of players.

2. The method of claim 1 wherein step (c) occurs upon conclusion of the betting period for the currently executing game of chance.

3. The method of claim 1 wherein the random process generates the output result and the generation of the output result occurs only after conclusion of the betting period for the currently executing game of chance.

4. The method of claim 1 wherein the random process is a generation of an output result from a random number generator.

5. The method of claim 1 wherein the random process is a generation of an output result from a ball-drop machine.

6. The method of claim 1 wherein the plurality of different texture data is stored in a lookup table of the memory and the output of the RNG is used to select the texture data from a predefined location in the lookup table.

7. The method of claim 1 wherein the partially rendered video segment is a virtual or real world video image.

8. The method of claim 1 wherein the partially rendered video segment is a digital image file.

9. The method of claim 1 wherein the plurality of elements are animated 3D images or characters.

10. A method of playing a game of chance having a game outcome on a plurality of different local computer devices, the game of chance being played by a plurality of players on their respective local computer devices, the game of chance being represented by a fully rendered video segment created from a variation of a partially rendered video segment, the partially rendered video segment not including texture data, the partially rendered video segment including a plurality of elements associated with the game of chance, each of the plurality of elements having one or more variable features defined by the texture data which allow for different game outcomes, the game of chance having a betting period where the game players wager on the game outcome of a currently executing game of chance, the method comprising:

(a) generating the partially rendered video segment offline prior to game play;
(b) storing the partially rendered video segment in a memory of the respective local computer devices prior to game play, and
(c) storing a plurality of different sets of texture data in memory that is accessible by the respective local computer devices, wherein the one or more variable features defined by the texture data determine the game outcome;
(d) using an output of a random process executing in a server to electronically select one of the different sets of texture data for the currently executing game of chance on the respective local computer devices;
(e) electronically providing the selected sets of texture data to the respective local computer devices;
(f) during game play, generating in the respective local computer devices a fully rendered video segment for the currently executing game of chance from the partially rendered video segment stored in the respective local computer device and the selected set of texture data provided to the respective local computer device, the fully rendered video segment showing the game outcome, and wherein each of the plurality of elements is rendered with one or more visibly different variable features, and selected variable features of one of the elements do not appear in any of the other elements, so that the texture data is visibly different for each of the plurality of elements; and
(g) displaying the fully rendered video segment on each of the respective local computer devices for viewing by the plurality of players.

11. The method of claim 10 wherein in step (d), the plurality of different sets of texture data are stored in memory of server and are electronically transmitted in step (e) to respective local computer devices.

12. The method of claim 10 wherein in step (d), the plurality of different sets of texture data are stored in memory of the respective local computer devices and are electronically accessed in step (e) by the respective local computer devices.

13. The method of claim 10 wherein at least some of the local computer devices are mobile devices that send and receive data via a wireless network.

14. A method of playing a game of chance having a game outcome on a plurality of different local computer devices, the game of chance being played by a plurality of players on their respective local computer devices, the game of chance being represented by a fully rendered video segment created from a variation of a partially rendered video segment, the partially rendered video segment not including texture data, the partially rendered video segment including a plurality of elements associated with the game of chance, each of the plurality of elements having one or more variable features defined by the texture data which allow for different game outcomes, the game of chance having a betting period where the game players wager on the game outcome of a currently executing game of chance, the method comprising:
(a) generating the partially rendered video segment offline prior to game play;
(b) storing in a memory of the respective local computer devices prior to game play:
(i) the partially rendered video segment, and
(ii) a plurality of different sets of texture data, wherein the one or more variable features defined by the texture data determine the game outcome;
(d) providing by a server an output of a random process for use in electronically selecting one of the different sets of texture data for the currently executing game of chance;
(e) electronically transmitting the output of the random process from the server to the respective local computer devices;
(f) each of the respective local computer devices using the output of the random process to select one of the different sets of texture data for the currently executing game of chance;
(g) during game play, generating in the respective local computer devices a fully rendered video segment for the currently executing game of chance from the partially rendered video segment and the selected set of texture data, the fully rendered video segment showing the game outcome, and wherein each of the plurality of elements is rendered with one or more visibly different variable features, and selected variable features of one of the elements do not appear in any of the other elements, so that the texture data is visibly different for each of the plurality of elements; and
(h) displaying the fully rendered video segment on each of the respective local computer devices for viewing by the plurality of players.

15. The method of claim 14 wherein at least some of the local computer devices are mobile devices that send and receive data via a wireless network.

* * * * *